US007300971B2

(12) United States Patent
Sato et al.

(10) Patent No.: US 7,300,971 B2
(45) Date of Patent: Nov. 27, 2007

(54) PARTICLE COMPOSITION, RECORDING METHOD, AND RECORDING APPARATUS USING THE PARTICLE COMPOSITION

(75) Inventors: Koichi Sato, Kanagawa (JP); Ikuo Nakazawa, Kanagawa (JP); Tomonari Horikiri, Kanagawa (JP); Sakae Suda, Kanagawa (JP); Masayuki Ikegami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 10/457,419

(22) Filed: Jun. 10, 2003

(65) Prior Publication Data

US 2003/0232904 A1 Dec. 18, 2003

(30) Foreign Application Priority Data

| Jun. 14, 2002 | (JP) | ............................. 2002-174345 |
| Jul. 3, 2002 | (JP) | ............................. 2002-195118 |
| May 30, 2003 | (JP) | ............................. 2003-155758 |

(51) Int. Cl.
*C08L 53/00* (2006.01)
*C08L 71/00* (2006.01)
*C08L 29/10* (2006.01)
*C08F 16/12* (2006.01)

(52) U.S. Cl. ..................... 524/505; 524/612; 526/333
(58) Field of Classification Search ................ 523/160, 523/161, 200, 205, 332, 333; 524/505, 612; 526/332, 333

See application file for complete search history.

(56) References Cited

U.S. PATENT DOCUMENTS

| 3,062,892 | A | | 11/1962 | Schneider ................... 260/609 |
| 5,145,518 | A | * | 9/1992 | Winnik et al. ............... 523/161 |
| 5,441,841 | A | | 8/1995 | Larson et al. ................ 430/115 |
| 5,459,007 | A | | 10/1995 | Larson et al. ................ 430/115 |
| 5,559,588 | A | | 9/1996 | Larson et al. ................ 355/256 |
| 5,693,375 | A | * | 12/1997 | Sato et al. ................... 427/522 |
| 6,305,787 | B1 | * | 10/2001 | Nakazawa et al. ............. 347/51 |
| 7,067,590 | B2 | * | 6/2006 | Sato et al. ................... 525/299 |
| 2002/0186288 | A1 | * | 12/2002 | Nakazawa et al. ........... 347/100 |
| 2003/0027894 | A1 | * | 2/2003 | Sato et al. ................... 523/160 |
| 2003/0050364 | A1 | * | 3/2003 | Sato et al. ................... 523/160 |
| 2003/0153649 | A1 | * | 8/2003 | Bromberg ................... 523/160 |
| 2003/0204022 | A1 | * | 10/2003 | Kennedy et al. ............. 525/242 |

FOREIGN PATENT DOCUMENTS

| EP | 0 227 141 A1 | 7/1987 |
| EP | 0 355 585 A2 | 2/1990 |
| EP | 0 497 522 A1 | 8/1992 |
| EP | 0 556 649 | 8/1993 |
| JP | 5-273792 | 10/1993 |
| JP | 11-80221 | 3/1999 |
| JP | 11-322866 | 11/1999 |
| JP | 11-322942 | 11/1999 |
| WO | WO 93/19400 | 9/1993 |
| WO | WO 97/49387 A1 * | 12/1997 |
| WO | WO 01/77198 | 10/2001 |

OTHER PUBLICATIONS

Esin Gulari et al., "Photon Correlation Spectroscopy of Particle Distributions," 70(8) *J. Chem. Phys.* 3965-3972 (Apr. 1979).
European Search Report in Application No. 03012944.9 (Aug. 28, 2003).
European Search Report in Application No. 03012944.9 (Oct. 24, 2003).

\* cited by examiner

*Primary Examiner*—Callie Shosho
(74) *Attorney, Agent, or Firm*—Fitzpatrick, Cella, Harper & Scinto

(57) ABSTRACT

A composition comprises a non-aqueous solvent containing reverse micelle particles formed of block polymers having amphipathic properties. A particle composition and a composition wherein particles are dispersed, which exhibits excellent dispersion properties and can form superbly uniform particles, is provided. Further, display elements, a recording method, and recording apparatus, which employ the composition having excellent dispersion properties and forming superbly uniform particles, are provided.

3 Claims, 1 Drawing Sheet

PARTICLE COMPOSITION, RECORDING METHOD, AND RECORDING APPARATUS USING THE PARTICLE COMPOSITION

BACKGROUND OF THE INVENTION

1. Field of the Invention

The present invention relates to a particle composition, a recording method, and a recording apparatus employing the particle composition. Particularly, the present invention relates to particles, which exhibit electrophoresis, employed in ink or toner used for a printer or the like, or a display element or the like.

2. Description of the Related Art

Electrophotographic devices, electrophoretic displays, and so forth, have been known as image formation devices employing electrophoretic particles. Most of these devices operate with a mechanism wherein charged color material particles exhibit electrophoresis under a static electric field, whereby a pixel is manifested. In recent years, development of high resolution and high-speed digital printing devices using the wet electrophotography is actively being undertaken. Also, in the field of displays, use of electrophoretic particles is being undertaken for on-demand reflection displays with low power consumption, which require no backlight and have the nature of memory for display. These particles readily exhibit excellent driving properties and developing properties generally using a non-aqueous medium, specifically, by dispersing the particles in a non-aqueous medium, typically, an organic solvent, rather than water or an aqueous solvent. In the present situation described above, development of the electrophoretic particles is undertaken for image formation devices with high resolution from various points of view (Japanese Patent Laid-Open No. 5-273792), and development of the electrophoretic particles having more excellent properties is expected.

On the other hand, functional materials as particle compositions for being dispersed in a non-aqueous solvent, rather than in water or a aqueous solvent, are being developed for the field of the color materials such as ink and the like, and for optical materials.

SUMMARY OF THE INVENTION

It is an object of the present invention to provide a particle composition and a composition wherein particles are dispersed, having excellent dispersion properties, which can form uniform particles in a superb manner. Furthermore, it is an object of the present invention to provide a display element, a recording method, and a recording apparatus, using the aforementioned composition with excellently dispersion properties, which forms uniform particles in a superb manner.

To this end, according to a first aspect of the present invention, a composition comprises a non-aqueous solvent containing reverse micelle particles formed of block polymers having amphipathic properties.

The amphipathic block polymer may be a block polymer having three or more block segments, and may be a high molecular compound having a repeated unit structure of polyvinyl ether.

The composition may contain functional materials, and the materials may be contained in the reverse micelle particles.

The block polymer may have a repeated unit structure represented by

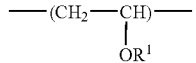
General chemical formula (1)

wherein $R^1$ is selected from the straight-chain, branched or cyclic alkyl group with a straight chain with a carbon number between one and eighteen, -Ph, -Pyr, -Ph-Ph, -Ph-Pyr, $-(CH(R^5)-CH(R^6)-O)_p-R^7$, and $-(CH_2)_m-(O)_n-R^7$, and wherein the hydrogen atom of the aromatic ring may be substituted for a straight-chain or branched alkyl group with a carbon number between one and four, and wherein the carbon atom of the aromatic ring may be substituted for a nitrogen atom; and wherein p denotes an integer between 1 and 18, m denotes an integer between 1 and 36, and n is 0 or 1; and wherein $R^5$ and $R^6$ are independently selected from $-H$ or $-CH_3$; and wherein $R^7$ is formed of $-H$, a straight-chain, branched, or cyclic alkyl group with a carbon number between 1 and 18, -Ph, -Pyr, -Ph-Ph, -Ph-Pyr, $-CHO$, $-CH_2CHO$, $-CO-CH=CH_2$, $-CO-C(CH_3)=CH_2$, $-CH_2COOR_8$, wherein in the event that $R^7$ is other than a hydrogen atom, the hydrogen atom combined with the carbon atom within $R^7$ may be substituted for a straight-chain or branched alkyl group with a carbon number between one and four, $-F$, $-Cl$, or $-Br$, and the carbon atom of the aromatic ring may be substituted for a nitrogen atom; and wherein R8 is $-H$ or the alkyl group with a carbon number between one and five, wherein Ph represents the phenyl group, and Pyr represents the pyridyl group.

The average particle diameter of the reverse micelle particles may be equal to or less than 200 nm, and the particle distribution (dispersion index $\mu/G^2$) thereof equal to or less than 0.2.

The non-aqueous solvent may be an organic solvent, and the functional material may be a color material.

According to a second aspect of the present invention, with a recording method, recording on a medium is performed using a composition in which a non-aqueous solvent contains reverse micelle particles formed of block polymers having amphipathic properties.

According to a third aspect of the present invention, a recording apparatus performs recording using a composition in which a non-aqueous solvent contains reverse micelle particles formed of block polymers having amphipathic properties.

According to a fourth aspect of the present invention, an ink composition contains a composition wherein a non-aqueous solvent contains reverse micelle particles formed of block polymers having amphipathic properties.

According to a fifth aspect of the present invention, particles, which exhibit electrophoresis, contain a composition wherein a non-aqueous solvent contains reverse micelle particles formed of block polymers having amphipathic properties.

According to a sixth aspect of the present invention, a wet toner employs particles, which exhibit electrophoresis, containing a composition wherein a non-aqueous solvent contains reverse micelle particles formed of block polymers having amphipathic properties.

According to a seventh aspect of the present invention, a display element employs particles, which exhibit electrophoresis, containing a composition wherein a non-aqueous solvent contains reverse micelle particles formed of block polymers having amphipathic properties.

According to an eighth aspect of the present invention, particles wherein a non-aqueous solvent contains compounds having amphipathic block polymers, and pigments, are dispersed in a composition.

According to a ninth aspect of the present invention, a recording method uses a composition in which are dispersed particles wherein a non-aqueous solvent contains compounds having amphipathic block polymers and pigments.

According to a tenth aspect of the present invention, a recording apparatus uses a composition in which are dispersed particles wherein a non-aqueous solvent contains compounds having amphipathic block polymers and pigments.

Further objects, features and advantages of the present invention will become apparent from the following description of the preferred examples with reference to the attached drawings.

DESCRIPTION OF THE PREFERRED EXAMPLES

Figure 1:
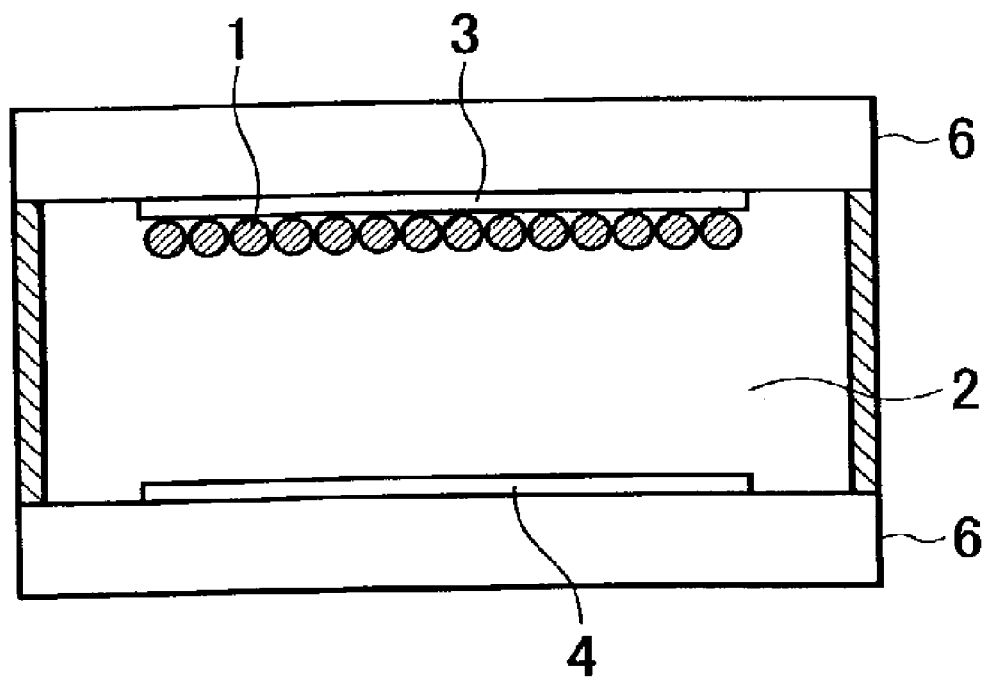
FIG. 1 is a schematic diagram which illustrates an example of electrophoretic elements using electrophoretic particles according to the present invention.
Figure 1:
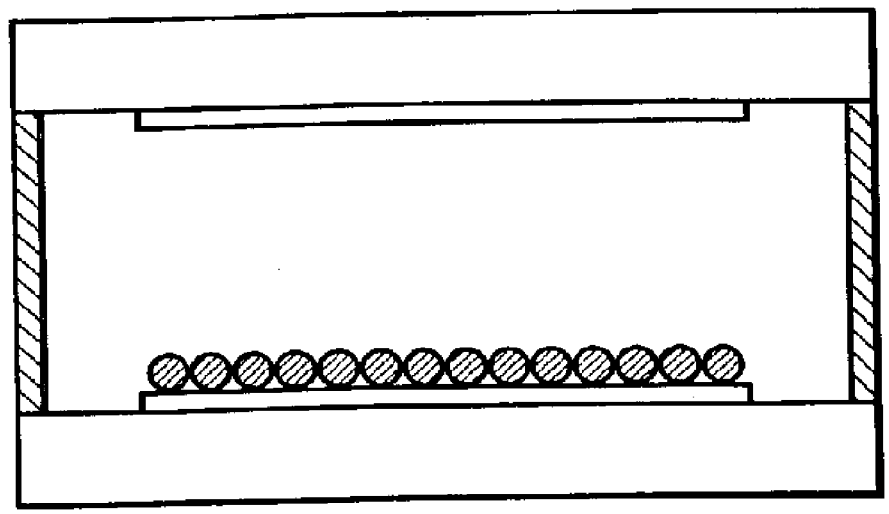

The present inventors have made the present invention upon zealously-conducted research. Description thereof will now be made in detail.

A first example of the present invention relates to a reverse-micelle-particle-containing composition wherein a non-aqueous solvent contains reverse micelle particles formed of block polymers having amphipathic properties.

Furthermore, a second example of the present invention relates to a composition wherein reverse micelle particles formed of block polymers with the amphipathic properties are dispersed in a non-aqueous solvent, and an ink composition having the feature of containing the aforementioned composition with an average diameter of the reverse micelle particle of 200 nm or less, and particle diameter distribution (dispersion index $\mu/G^2$) of 0.2 or less.

The composition of the present invention is a composition contained in a non-aqueous solvent. Examples of non-aqueous solvents include organic solvents, resin, and the like. As an organic solvent, a hydrocarbon solvent such as hexane, heptane, octane, decane, toluene, ISOPER (phonetic spelling, the same hereafter), or the like, or a solvent such as cyclohexanone, acetone, methyl ethyl ketone, butyl acetate, or the like, can be used. Furthermore, natural fats and oils such as olive oil, soybean oil, beef tallow, lard, or the like, can be employed. Moreover, silicone oil, fluorine oil, can be used. Examples of binder resin include styrene-acrylonitrile copolymer, polyester, and the like.

The content of non-aqueous solvent used for the composition of the present invention is in the range between 1% by mass and 99.8% by mass. The content is preferably in the range between 5% by mass and 99.5% by mass. Furthermore, the content is more preferably in the range between 10% by mass and 99% by mass. In the event that the content is less than 1% by mass, the dispersion of the particles could be insufficient, and in the event that the content is greater than 99.8% by mass, the effect of dispersion could be insufficient.

Description will be made regarding a block polymer with the amphipathic properties, which is a further feature according to the present invention. As specific examples of block polymers which can be used for the present invention, conventionally-known block polymers such as acrylic or methacrylic block polymers, block polymers formed of polystyrene and blocks of other addition-polymerized or polycondensed block polymers, block polymers having blocks of polyoxyethylene and polyoxyalkylene, or the like, can be used. With the present invention, a block polymer containing a structure of polyvinyl-ether is preferably employed. Furthermore, in the present invention, a block polymer may be a graft polymer containing a polyvinyl ether structure, and a certain segment of the block polymer may be a copolymerization segment, and the form of the copolymerization is not restricted, rather, random segments or graduation segments may be employed, for example.

Now, description will be made regarding to a block polymer containing a polyvinyl structure, which is preferably employed in the present invention. While a great number of reports have been made with regard to the synthesis methods for polymers containing a polyvinyl structure (Japanese Patent Laid-Open No. 11-080221), a method with the cation living polymerization proposed by Aoshima et al. (Japanese Patent Laid-Open No. 11-322942, Japanese Patent Laid-Open No. 11-322866) is known as a typical example. With the method, polymer synthesis is performed with the cation living polymerization, whereby a homopolymer or a copolymer formed of two or more kinds of monomers, and furthermore, various polymers such as a block polymer, graft polymer, graduation polymer, and the like, can be synthesized with the length (molecular weight) being precisely adjusted. Furthermore, with this polyvinyl ether, various functional groups can be introduced to the side chains thereof. The cation polymerization method can be performed in the $HI/I_2$ system, $HCl/SnCl_4$ system, as well.

Also, the structure of the block polymer containing the polyvinyl ether structure may be a copolymer formed of vinyl ether and another polymer. Also, a graft polymer wherein a block polymer is grafted into the chain of another high molecule may be employed.

With the present invention, a block polymer with a block form such as AB, ABA, ABD, ABDE, or the like, is preferably employed. Note that A, B, D, and E each represent different block segments. Each block segment may be a segment formed of single repetitious units, or may be a copolymerization segment formed of multiple repetitious units.

More specifically, the block polymer containing a polyvinyl ether structure preferably has a repetitious unit structure of a polyvinyl ether structure. As a specific example, a unit structure represented by the following general chemical formula (1) is preferably employed.

General chemical fomula (1)

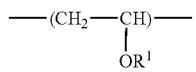

In the formula, $R^1$ is selected from the straight-chain, branched or cyclic alkyl group with a straight chain with a carbon number between one and eighteen, -Ph, -Pyr, -Ph-Ph, -Ph-Pyr, $—(CH(R^5)—CH(R^6)—O)_p—R^7$, and $—(CH_2)_m—(O)_n—R^7$, wherein the hydrogen atom of the aromatic ring may be substituted for a straight-chain or branched alkyl group with a carbon number between one and four, and the carbon atom of the aromatic ring may be substituted for a nitrogen atom. Note that p denotes an integer between 1 and 18, m denotes an integer between 1 and 36, and n is 0 or 1. Note that $R^5$ and $R^6$ are independently selected from —H or —CH$_3$.

$R^7$ is formed of —H, a straight-chain, branched, or cyclic alkyl group with a carbon number between 1 and 18, -Ph, -Pyr, -Ph-Ph, -Ph-Pyr, —CHO, —CH$_2$CHO, —CO—CH=CH$_2$—CO—C(CH$_3$)=CH$_2$, —CH$_2$COOR$_8$, wherein in the event that $R^7$ is other than a hydrogen atom, the hydrogen atom combined with the carbon atom within $R^7$ may be substituted for a straight-chain or branched alkyl group with a carbon number between one and four, —F, —Cl, or —Br, and the carbon atom of the aromatic ring may be substituted for a nitrogen atom. R8 is —H or the alkyl group with a carbon number between one and five. Note that Ph represents the phenyl group, and Pyr represents the pyridyl group.

With the present invention, -Ph represents the phenyl group, -Pyr represents the pyridyl group, -Ph-ph represents the biphenyl group, and -Ph-Pyr represents the pyridylphenyl group. With the phenyl group, the biphenyl group, and the pyridylphenyl group, any position isomer can be employed.

With the present invention, a block polymer with amphipathic properties is employed. For example, hydrophobic block segments and hydrophilic block segments are selected from the repeated unit structure represented by the above-described general chemical formula (1), and synthesis is performed, thereby obtaining the block polymer with amphipathic properties.

Next, structures of vinylether monomer are shown as examples of repeated unit structures of a polyvinyl ether structure of a block polymer. Note that the polyvinyl ether structure employed in the present invention is not restricted to these structures.

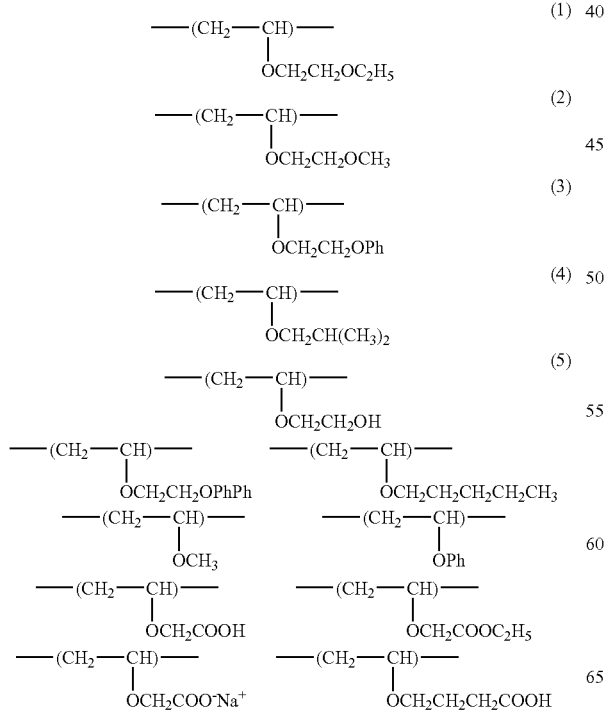

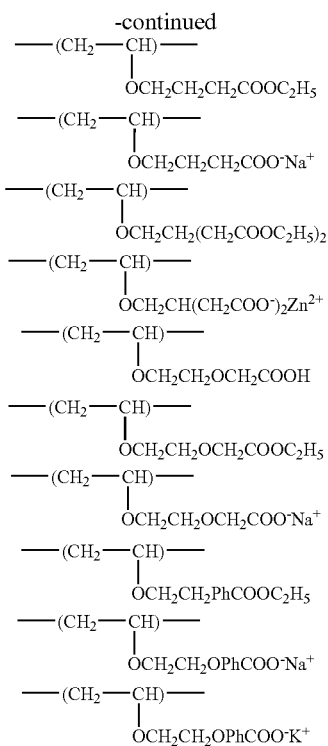

With the specific examples of the repeated unit structure described above, of the chemical formulas (1) through (5), the chemical formulas (3) and (4) represent hydrophobic unit structures, and the chemical formulas (1), (2), and (5) represents unit structures which changes to the hydrophilic properties or the hydrophobic properties depending upon other conditions.

As examples, structures of polyvinyl ether block polymer formed of these vinylether monomer will be shown below. Note that the polymer employed in the present invention is not restricted to these structures.

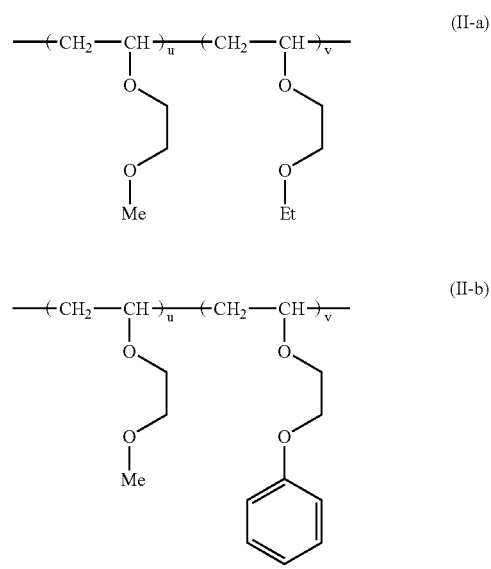

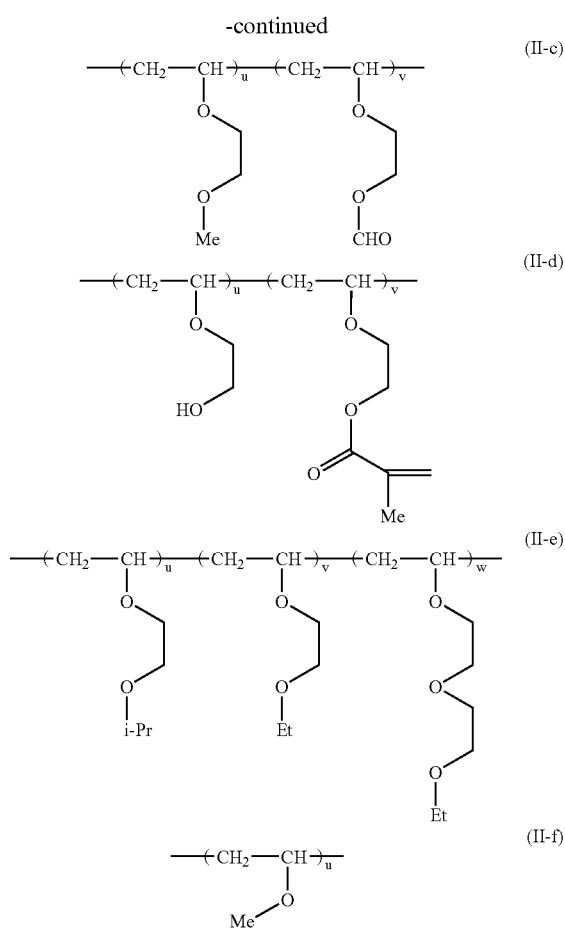

With this polyvinyl ether as described above, the numbers of the repeated units u, v, and w, are preferably equal to or greater than 3 and equal to or less than 10,000, independently, and furthermore, the sum (u+v+w) is more preferably equal to or greater than 10 and equal to or less than 20,000.

The molecular weight distribution of the block polymer employed in the present invention (=Mw(weight–average molecular weight)/Mn(number–average molecular weight)) is equal or less than 2.0, is preferably equal to or less than 1.6, further preferably equal to or less than 1.3, and moreover preferably equal to or less than 1.4. The number-average molecular weight (Mn) of the block polymer employed in the present invention is preferably in the range between 1000 and one million, and in the event that the number-average molecular weight is less than 1000, or greater than one million, materials which exhibit desired functions could not be dispersed well in a solvent.

Furthermore, molecular movement of the block polymer is preferably more flexible for improving dispersion stability and improving properties of containing materials, due to the block polymer having properties of readily having affinity for functional materials in a physical manner. Furthermore, the molecular movement of the block polymer is preferably flexible for easily forming a coating layer on a recording medium, as well, as described later in detail. Moreover, the molecular movement of the block polymer is preferably flexible for easily forming particles with a uniform particle diameter, as well, as described later. Accordingly, the glass-transition temperature Tg of the principal chain of the block polymer is preferably equal or less than 20° C., and more preferably 0° C., and further preferably −20° C. From this point of view, the polymer having a polyvinyl ether structure is preferably employed due to the low glass-transition temperature thereof and the flexible properties thereof.

The content of the above-described block polymer contained in the composition of the present invention is in the range between 0.1% by weight and 80% by weight, and is preferably in the range 0.5% by weight and 60% by weight. In the event that the amount of the block polymers is less than 0.1% by weight, the color materials contained in the ink composition of the present invention could not be sufficiently dispersed, or could not be contained in the block polymers. Conversely, in the event that the amount of the block polymers is greater than 80% by weight, the viscosity of the ink composition could be too great.

Furthermore, with the present invention, the composition formed of block polymers having a feature of having three or more block segments is preferably employed. As a typical example, triblock polymer is known. In this case, the block polymer has at least one amphiphilic segment with and one amphiphobic segment, and further at least one block segment other than these two segments. The block polymer has an amphiphilic segment and an amphiphobic segment, which are required for forming a reverse micelle particle, and furthermore, at least one segment having another function, thereby enabling a high functional dispersion composition to be provided.

Furthermore, the composition of the present invention preferably contains a functional material. The functional material is preferably a fluid, or a solid, and may be a dissolvent substance. For example, oils, pigments as color materials, paints, metal, herbicides, insecticides, biomaterials, dyes, pharmaceuticals, or molecular catalysts, can be employed. The content of the functional material contained in the composition of the present invention is equal to or greater than 0.1% by weight and equal to or less than 80% by weight, and is preferably equal to or greater than 0.5% by weight and equal to or less than 60% by weight. In the event that the content is less than 0.1% by weight, the functional material could not sufficiently exhibit the function thereof. Conversely, in the event that the content is greater 80% by weight, dispersion could be insufficient. Description will be made below regarding specific examples of color materials preferably employed as functional materials.

With the pigments, either organic pigments or inorganic pigments may be employed, and as pigments employed for ink, a black pigment and pigments of the three primary color of cyan, magenta, and yellow, can be preferably employed. Note that color pigments other than those described above, colorless or light-color pigments, or metallic-luster pigments, or the like may be employed. Furthermore, with the present invention, commercially-available pigments may be employed, or specially-synthesized pigments may be employed. Also, the pigments and dyes may be employed together.

Examples of commercially-available pigments with regard to black, cyan, magenta, and yellow, will be given below.

Examples of black pigments include Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA 11, Raven 1190 ULTRA 11 (which are manufactured by Colombian Carbon Co.), Black Pearls L, MOGUL-L, Regal 400R, Regal 660R, Regal 330R, Monarch 800, Monarch 880, Monarch 900, Monarch 1000, Monarch 1300, Monarch 1400 (which are manufactured by Cabot Co.), Color Black FW1, Color Black FW2, Color Black FW200, Color Black 18, Color Black S160, Color Black S170, Special Black 4, Special Black 4A, Printex 35, Printex U, Printex 140U, Printex V, Printex 140V (which are manufactured by Degussa Co.), No. 25, No. 33, No. 40, No. 47, No. 52, No. 900, No. 2300, MCF-88, MA600, MA7, MA8, MA100 (which are manufactured by Mitsubishi Chemical Co.), and the like. Note that the black pigments employed in the present invention is not restricted to these examples.

Examples of cyan pigments include C. I. Pigment Blue-1, C. I. Pigment Blue-2, C. I. Pigment Blue-3, C. I. Pigment Blue-15, C. I. Pigment Blue-15:2, C. I. Pigment Blue-15:3, C. I. Pigment Blue-15:4, C. I. Pigment Blue-16, C. I. Pigment Blue-22, C. I. Pigment Blue-60, and the like. Note that the cyan pigments employed in the present invention is not restricted to these examples.

Examples of magenta pigments include C. I. Pigment Red-5, C. I. Pigment Red-7, C. I. Pigment Red-12, C. I. Pigment Red 48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, C. I. Pigment Red-202, C. I. Pigment Red-207, and the like. Note that the magenta pigments employed in the present invention is not restricted to these examples.

Examples of yellow pigments include C. I. Pigment Yellow-12, C. I. Pigment Yellow-13, C. I. Pigment Yellow-14, C. I. Pigment Yellow-16, C. I. Pigment Yellow-17, C. I. Pigment Yellow-74, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151, C. I. Pigment Yellow-154, and the like. Note that the yellow pigments employed in the present invention is not restricted to these examples.

Also, pigments which can spontaneously disperse in water may be employed in the ink composition of the present invention. As the pigments which can be dispersed in water, pigments, using the effect of steric hindrance, of which surfaces have absorbed polymers, and pigments using the electrostatic repulsion are known. Examples of commercially-available products include CAB-0-JET200 and CAB-0-JET300 (which are manufactured by Cabot Co.), and Microjet Black CW-1 (Oriental Chemical Co.), and the like.

The content of the pigment employed in the composition of the present invention is preferably in the range between 0.1% by mass and 50% by mass as to the total mass. In the event that the content is less than 0.1% by mass, sufficient image contrast cannot be obtained. Conversely, in the event that the content is greater than 50% by mass, the condensation of the pigment is caused, and the pigment cannot be dispersed. The content of pigment is more preferably in the range between 0.5% by mass and 30% by mass.

Furthermore, with the composition of the present invention, dyes may be employed. Direct dyes, acid dyes, basic dyes, reactive dyes, water-soluble dyes for food dyes, or insoluble dyes for dispersion dyes, as described below, may be employed.

Examples of water-soluble dyes include direct dyes such as C. I. Direct Black-17, -19. -22. -32, -38, -51, -62, -71, -108, -146, -154; C. I. Direct Yellow-12, -24, -26, -44, -86, -87, -98, -100, -130, -142,; C. I. Direct Red-1, -4, -13, -17, -23, -28, -31, -62, -79, -81, -83, -89, -227, -240, -242, -243; C. I. Direct Blue-6, -22, -25, -71, -78, -86, -90, -106, -199; C. I. Direct Orange-34, -39, -44, -46, -60; C. I. Direct Violet-47, -48; C. I. Direct Brown-109; C. I. Direct Green-59, and the like, the acid dyes such as C. I Acid Black-2, -7, -24, -26, -31, -52, -63, -112, -118, -168, -172, -208; C. I Acid Yellow-11, -17, -23, -25, -29, -42, -49, -61, -71; C. I Acid Red-1, -6, -8, -32, -37, -51, -52, -80, -85, -87, -92, -94, -115, -180, -254, -256, -289, -315, -317; C. I Acid Blue-9. -22, -40, -59, -93, -102, -104, -113, -117, -120, -167, -229, -234, -254; C. I Acid Orange-7, -19; C. I Acid Violet-49, and the like, the reactive dyes such as C. I Reactive Black-1, -5, -8, -13, -14, -23, -31, -34, -39; C. I Reactive Yellow-2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163; C. I Reactive Red-3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, -221; C. I Reactive Blue-2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, -217; C. I Reactive Orange-5, -7, -11, -12, -13, -15, -16, -35, -45, -46, -56, -62, -70, -72, -74, -82, -84, -87, -91, -92, -93, -95, -97, -99; C. I Reactive Violet-1, -4, -5, -6, -22, -24, -33, -36, -38; C. I Reactive Green-5, -8, -12, -15, -19, -23; C. I Reactive Brown-2, -7, -8, -9, -11, -16, -17, -18, -21, -24, -26, -31, -32, -33, and the like, C. I Basic Black-2, C. I Basic Red-1, -2, -9, -12, -13, -14, -27; C. I Basic Blue-1, -3, -5, -7, -9, -24, -25, -26, -28, -29; C. I Basic Violet-7, -14, -27; C. I Food Black-1, -2, and the like.

Note that while the aforementioned examples of color materials are preferable for the present invention, the color materials employed in the composition of the present invention are not restricted to the above-described color materials. The content of the dye employed in the composition of the present invention is preferably in the range between 0.1% by weight and 50% by weight as to the weight of the ink.

With the composition of the present invention, the functional materials are preferably contained in reverse micelle particles. The functional materials are contained in the polymers, thereby enabling decomposition of the functional materials to be prevented.

Note that, with the reverse micelle particles formed of amphipathic block polymers according to the present invention, the amphipathic block polymer indicates a block polymer which is both amphiphilic and amphiphobic. Furthermore, the amphipathic block polymer preferably has hydrophile and hydrophobe. While a normal micelle particle is a particle having hydrophilic groups on the perimeter thereof and having hydrophobic groups at the inner core thereof in an aqueous solvent, a reverse micelle particle is a particle having hydrophobic groups on the perimeter thereof and having hydrophilic groups or amphiphobic groups at the inner core thereof in an organic solvent.

Materials wherein functional materials have been dissolved into small amount of water are introduced in the hydrophilic cores of reverse micelle particles in an organic solvent wherein block polymers are formed, whereby the reverse micelle particles containing the materials can be formed, for example. Also, the particle containing the functional materials can be formed with a method wherein polymers and color materials are dissolved in water following which phase inversion into an organic solvent is carried out so as to form reverse micelle particles containing the materials. Furthermore, for example, the particles containing the functional materials can be formed with a method wherein the functional materials dissolved in water are dispersed in reverse micelles in an organic solvent where block polymers are formed. Moreover, the particles containing the functional materials can be formed with a method wherein polymers are dissolved in water, and the functional materials are dispersed following which phase inversion into an organic solvent is performed.

In order to confirm the particles contain the functional materials, instrumental analysis such as analysis using various types of electron microscopes, analysis using X-ray diffraction, or the like, can be made. Also, in the event that reverse micelles contain the materials, the state wherein the reverse micelle particles contain the materials can be confirmed by separating polymers and the color materials from a solvent under reverse micelle disintegration conditions. Furthermore, in the event that the functional materials are insoluble as to a dispersion solvent in liquid, and excellent dispersion is obtained under coexistence with the reverse micelles, a judgment may be made that the functional materials are substantially contained in the reverse micelles. As described above, the block polymer preferably forms reverse micelle state, and accordingly, the block polymer employed in the present invention is preferably has amphipathic properties.

The content of the contained functional materials is preferably 90% or more, is more preferably 95% or more, and is furthermore preferably 98% or more. The content can be observed by analysis using various types of electron microscopes, analysis using X-ray diffraction, color density analysis for the color materials, as well.

A second example of the present invention is a composition wherein reverse micelle particles are dispersed in a non-aqueous solvent with the average particle diameter being 200 nm or less, and particle diameter distribution (dispersion index $\mu/G^2$) being 0.2 or less.

Here, the average particle diameter is defined as the Stokes diameter. The Stokes diameter can be measured with the sedimentation velocity method, photon correlation, ultrasonic attenuation spectoscopy, or the like. In the present invention, measurement is made with the dynamic light scattering using photon correlation. In general, as an index for uniformity of the particle diameters, the dispersion index $\mu/G^2$ ($\mu$ denotes the second coefficient of the cumulant expansion, G denotes the attenuation constant) is employed (The Journal of Chemical Physics, vol. 70, p3965, in 1979). This value can be obtained with the dynamic light scattering. Examples of particle diameter measurement apparatuses using the dynamic light scattering, include DLS7000 manufactured by Otsuka Electronics Co., Ltd., and the like. The particle diameter d measured with the apparatus is the Stokes diameter.

With the composition of the present invention, the average particle diameter is 200 nm or less, and the particle diameter distribution (dispersion index $\mu/G^2$) of is extremely narrow, i.e., 0.2 or less, such that interaction with visible light is hardly effected, and thus the composition can be made substantially transparent, although the composition is formed of a dispersion medium. The average particle diameter is more preferably 150 nm or less, and the particle diameter distribution (dispersion index $\mu/G^2$) is more preferably 0.1 or less. Furthermore, the average particle diameter is even more preferably 100 nm or less, with the particle diameter distribution (dispersion index $\mu/G^2$) of 0.1 or less. In the event that the average particle diameter exceeds 200 nm, and the particle distribution (dispersion index $\mu/G^2$) exceeds 0.2, scattering of visible light could be markedly caused. The composition described in the first example of the present invention is preferably employed for realize small particle diameter with uniform particle diameter distribution (dispersion index $\mu/G^2$).

A third example of the present invention is an image formation method which employs the above-described composition. Furthermore, preferably examples includes recording apparatus such as printer or the like, and a display element (device), which employs the compositions.

A fourth example of the present invention is an image formation apparatus using the aforementioned image formation method or the aforementioned device. As a specific example, an arrangement may be made wherein the composition of the present invention is employed as an electrophoretic particle composition. As a typical example of the electrophoretic particle composition, a wet toner used in wet electrophotography is known. In many cases, such a composition containing particles exhibiting electrophoresis (electrophoretic particle composition) contains charge-imparting agents such as metallic soap, chemical materials for improving dispersion, or the like. The diameter of the electrophoretic particle employed in the present invention is preferably equal to or less than 100 μm and equal to or greater than 0.001 μm, and furthermore, is more preferably equal to or less than 10 μm and equal to or greater than 0.01 μm. The measurement of the particle diameter can be made with an optical microscope, laser diffraction, or dynamic light scattering. Of these methods, the dynamic light scattering method is preferably employed for measuring the diameter of the particle in the range around between 0.01 μm and 10 μm, which is a preferable range of the particle diameter. Using the dynamic light scattering, the particle distribution can be measured. With the electrophoretic particles of the present invention, the particle diameter distribution is preferably uniform. As an index for the uniformity of the particle diameter, in general, the dispersion index $\mu/G^2$ ($\mu$ denotes the second coefficient of the cumulant expansion, and G is the attenuation constant) proposed by Gulari et al. is employed (The Journal of Chemical Physics, vol. 70, p3965, in 1979). This value can be obtained with the dynamic light scattering. The particle distribution of the electrophoretic particles employed in the present invention is preferably uniform with the dispersion index $\mu/G^2$ being 0.2 or less, and more preferably with the dispersion index $\mu/G^2$ being 0.1 or less, and furthermore, even more preferably with the dispersion index $\mu/G^2$ being 0.05 or less.

FIG. 1 is a schematic diagram which illustrates an example of electrophoresis using the electrophoretic particles, and a display element, according to the present invention. The basic configuration of the electrophoretic element serving as a display element should be a known configuration, and the configuration is not to be restricted to any particular one. The electrophoretic element should include display means comprising at least electrophoretic particles 1 according to the present invention, a dispersion medium 2 wherein the electrophoretic particles are dispersed, and a substrate 6 on which an electrode 3 or 4 is formed. The particles move in the direction of either the upper or lower electrode under application of an electric field, whereby display is performed according to the color tone of the particles and the dispersion medium. Furthermore, using particles formed using multiple dyes in different colors enables a display device which can handle multicolor display can be realized. In this case, in the event that the specific gravity of the particle differs according to the kind of the employed dye, this can be handled by adjusting the specific gravity of the dispersion medium. The image formation device of the present invention is employed in printing devices, or display devices, for example.

Driving means for providing driving signals according to the image information are further provided to the electrophoretic elements shown in FIG. 1, whereby an electrophoretic display device as an image formation device can be configured.

It is needless to say that the electrophoretic particles can be loaded in the apparatus for wet electrophotography so as to be used as a toner. Furthermore, the electrophoretic particles can be used for an ink jet apparatus employing oil ink marketed by Fuji Xerox Co., Ltd. (brand name Phaser) or the like, as well. While any of the known methods such as piezo ink jet method using a piezoelectric element or thermal ink jet method wherein recording is performed by applying thermal energy so as to cause bubbles, can be used for the ink jet method and ink jet apparatuses, the former is preferably employed. Also, either of continuous-type or on-demand type systems can be employed. Furthermore, the ink composition of the present invention can be employed in a recording method wherein following the ink being printed onto an intermediate transfer medium, the ink is transferred to a final recording medium such as a paper sheet, or the like.

Description will be made below regarding examples according to the present invention in detail. Note that the present invention is not restricted to these examples.

FIRST EXAMPLE

Synthesis of block polymers: Synthesis of a tri-block polymer formed of isobutyl-vinylether (IBVE: block A), 2-methoxy-ethoxy-vinylether (MOVE: block B), and 4-(2-vinyloxy)-ethoxy-ethyl-benzoate (VEOEtPhCOOEt: block C)

Following an atmosphere in a glass container with a 3-way valve being replaced by a nitrogen gas, the container was heated under the nitrogen gas atmosphere at 250° C. so as to remove absorbed water. Following the system being returned to room temperature, 12 mmol (milli-mol) of IBVE, 16 mmol of ethyl acetate, 0.05 mmol of 1-isobutoxy-ethyl-acetate, and 11 ml of toluene were added to the system, and subsequently, the reaction system was refrigerated. Upon the temperature of the system reaching 0° C., 0.2 mmol of ethylaluminium sesquichloride (equimolar mixture of diethylaluminium chloride and ethylaluminum dichloride) was added so that polymerization was started. The molecular weight was monitored in a time-sharing manner using molecular sieving column chromatography (GPC) so as to confirm completion of polymerization of the block A.

Subsequently, 12 mmol of the B block (MOVE) was added to the system, and the polymerization was continued. Following confirmation of the completion of polymerization of the block B by monitoring with GPC, a toluene solution with a component of block C of 10 mmol was added so that the polymerization was continued. After 20 hours, the polymerization was stopped. The stop of the polymerization was performed by adding an ammonia/methanol solution of 0.3% by mass into the system.

The reaction mixture solution was diluted with dichloromethane, was washed with hydrochloric acid of 0.6 M three times, and subsequently was washed with distilled water 3 times. The obtained organic phase was condensed and coagulated with an evaporator, and was subjected to vacuum drying following which dialysis was repeatedly performed for the obtained organic phase in a methanol solvent using a cellulose semi-permeable membrane so as to remove monomer compounds, whereby a tri-block polymer, which is the object, was obtained. Identification of the tri-block polymer compound was performed with NMR and GPC. With the measurement, Mn was 46,300, and Mw/Mn=1.36. The weight ratio of A:B:C was 200:200:30.

Furthermore, the obtained block polymer was hydrolyzed in a mixed solution of dimethyl-formamide and sodium hydroxide so that the component of the block C was hydrolyzed, whereby a tri-block polymer salified with sodium was obtained. Identification of the tri-block polymer compound was performed with NMR and GPC.

The polymer was dispersed in chloroform, whereby a transparent dispersion solution was obtained. The average particle diameter d and the dispersion index $\mu/G^2$ of the dispersion particles were measured using a dynamic light scattering apparatus (DLS-7000 manufactured by Otsuka Electronics Co., Ltd.). With the measurement, the average particle diameter d was 155 nm, and the dispersion index $\mu/G^2$ was 0.18.

SECOND EXAMPLE

Description will be made regarding an electrophoretic element using the electrophoretic particles. First of all, 20 units by weight of the above-described block polymer and 3 units by weight of a spontaneous-dispersion pigment for water (CAB-0-JET200 manufactured by Cabot Co.) were added to 30 units by weight of distilled water following which the mixture solution was dispersed with an ultrasonic homogenizer. The mixture solution was gradually added to 300 units by weight of a hydrocarbon organic solvent (ISOPER H) while stirring and dispersing the solution. Furthermore, 0.5 weight units of cobalt diiso-octyl-sulfosuccinate was added to the solution, and was stirred for ten hours under a temperature of 100° C. so that the particle dispersion compositions in the hydrocarbon organic solvent (ISOPER H) were adjusted, and filtration was performed with a Teflon (registered trademark) filter with a pore diameter of 0.4 μm, whereby a composition employed in the examples described below was obtained.

Copper electrodes formed on two glass substrates were disposed with a space of 300 μm therebetween, and the above-described particle dispersion composition was placed between the copper electrodes and left standing still. Upon applying an AC voltage of 300 V and 60 Hz to the structure, the black particles exhibited electrophoresis according to the electric field. Furthermore, the dispersion composition being left standing for a month and then tested, but change such as precipitation or the like did not occur, indicating that the dispersion composition was dispersed in a stable manner.

THIRD EXAMPLE

Upon the block polymer of the first example being dispersed in methylene chloride, a transparent dispersion solution was obtained. The average diameter d and the dispersion index $\mu/G^2$ of the dispersion particles were measured using a dynamic light scattering apparatus (DLS-7000 manufactured by Otsuka Electronics Co., Ltd.). The measurements showed the average particle diameter d to be 140 nm, and the dispersion index $\mu/G2$ to be 0.15.

FOURTH EXAMPLE

Description will be made regarding an electrophoretic element using the electrophoretic particles. First of all, 10 units by weight of the block polymer obtained in the example 1 and 3 weight units of C. I. Direct Black-17 were mixed in 20 units by weight of distilled water following which the solution was dispersed in 300 units by weight of a hydrocarbon organic solvent (ISOPER H). Furthermore, 0.5 units by weight of cobalt diiso-octyl-sulfo-succinate were added to the solution, and was stirred for ten hours under a temperature of 100° C. so that the particle dispersion compositions in the hydrocarbon organic solvent (ISOPER H) were adjusted, and filtration was performed with a Teflon (registered trademark) filter with a pore diameter of 0.4 μm, whereby a composition employed in the examples described below was obtained.

Copper electrodes formed on two glass substrates were disposed with a space of 300 μm therebetween, and the above-described particle dispersion composition was placed between the copper electrodes and left standing still. Upon applying an AC voltage of 300 V and 60 Hz to the structure, the black particles exhibited electrophoresis according to the electric field. The average diameter d and the dispersion index $\mu/G^2$ of the dispersion particles were measured using a dynamic light scattering apparatus (DLS-7000 manufactured by Otsuka Electronics Co., Ltd.). The measurements showed the average particle diameter d to be 160 nm, and the dispersion index $\mu/G^2$ to be 0.14. Note that in the event that C. I. Direct Black-17 was used independently, this was not dissolved in ISOPER H at all.

FIRST COMPARATIVE EXAMPLE

The same particle dispersion composition as with the example 2 was adjusted using Polymethacrylic acid (weight-average molecular weight of 30,000) instead of the block polymer used in the first example. After a month for storage following adjustment, precipitation occurred.

FIFTH EXAMPLE

Synthesis of Amphipathic Block Polymer:

Adjustment of monomer: 2-methoxy-ethyl-vinylether (which will be abbreviated to "MOVE" hereafter) and 2-ethoxy-ethyl-vinylether (which will be abbreviated to "EOVE" hereafter) were synthesized by performing reflux for 2-chloroethyl-vinyl-ether, and sodium methoxide and sodium ethoxide, respectively, using a tetrabutyl-ammonium iodide catalyst (H. J. Schneider, U. S. Pat. No. 3,062,892 (1962)). 2-vinyloxy-ethyl-methacrylate (which will be abbreviated to VEM hereafter) was synthesized with the Williamson reaction. Synthesis of AB-di-block polymers formed of MOVE and EOVE:

Following an atmosphere in a glass container with a 3-way valve being replaced by a nitrogen gas, the container was heated under the nitrogen gas atmosphere at 250° C. so as to remove absorbed water. Following the system being returned to room temperature, 12 mmol of MOVE, 16 mmol of ethyl acetate, 0.1 mmol of 1-isobutoxy-ethyl-acetate, and 11 ml of toluene were added to the system. Upon the temperature of the system reaching 0° C., 0.2 mmol of an ethylaluminium sesquichloride/toluene of 25% by weight solution was added so that polymerization was started, whereby the component A of the AB block polymer was synthesized. The molecular weight was monitored in a time-sharing manner using molecular sieving column chromatography (GPC), and following completion of polymerization of the component A, 12 mmol of EOVE was added to the system, whereby synthesis of the component B was performed. The polymerization was stopped by adding an ammonia/methanol solution of 0.3% by weight into the system. The mixture solution following this reaction was diluted with dichloromethane, was washed with hydrochloric acid of 0.6 M three times, and subsequently was washed with distilled water 3 times. The obtained organic phase was condensed and coagulated with an evaporator following which vacuum drying was performed for the obtained organic phase, whereby a MOVE-EOVE-di-block polymer, which is the object, was obtained. Identification of the compound was performed with NMR and GPC. With both measurements, satisfied spectrographs were obtained (Mn=2.5×10$^4$, MnA/MnB=~A×10$^4$/B×10$^4$, Mn/Mw=1.3). Subsequently, 20 units by weight of the above-described polymer and 3 weight units of Black Pigment Mogul L (manufactured by Cabot Co.) were added to 30 units by weight of distilled water following which the mixture solution was dispersed with an ultrasonic homogenizer. The mixture solution was gradually added to 300 units by weight of a hydrocarbon organic solvent (ISOPER H) while stirring and dispersing the solution. Furthermore, 0.5 weight units of cobalt diiso-octyl-sulfo-succinate was added to the solution, and was stirred for ten hours under a temperature of 100° C. so that the particle dispersion compositions in the ISOPER H were adjusted. The particle dispersion composition obtained in the fifth example, which had been stored for three months at room temperature, was placed in the space of 300 μm between two copper electrodes formed on two glass substrates and left standing still. Upon applying an AC voltage of 300 V and 60 Hz to the structure, the black particles exhibited electrophoresis according to the electric field.

SIXTH EXAMPLE

The particle dispersion composition described in the fifth example, which had been stored for three months at room temperature, was placed in the space of 300 μm between two copper electrodes formed on two glass substrates and left standing still, in the same way as with the fifth example. Upon applying an AC voltage of 300 V and 60 Hz to the structure, the black particles exhibited electrophoresis according to the electric field.

COMPARATIVE EXAMPLE 2

The same particle dispersion composition as with the second example was adjusted using Polymethacrylic acid (weight-average molecular weight of 30,000) instead of the polymer used in the fifth example. The particle dispersion composition for comparison, which had been stored for three months at room temperature, was placed in the space of 300 μm between two copper electrodes formed on two glass substrates and left standing still. Upon applying an AC voltage of 300 V and 60 Hz to the structure, the black particles did not exhibit electrophoresis according to the electric field.

SEVENTH EXAMPLE

Block polymers were synthesized from monomers described below in the same way as with the fifth example. Monomer-a1:4-(2-vinyloxy)ethoxy-biphenyl of 50% and monomer-a2:isobutyl-vinyl-ether of 50% were used for the block A. 2-methoxy-ethoxy-vinyl-ether was used for the block B. 4-(2-vinyloxy)ethoxy-ethyl-hexonoate was used for the block C. The weight ratio of A, B, and C was 100:200:80, and identification of compounds was performed using NMR and GPC (Mn was 3.4×10$^4$, and Mw/Mn was 1.39). Subsequently, alkaline hydrolysis was performed for the obtained compound, whereby a polymer wherein all carboxylate ester units thereof have been substituted for sodium carboxylate units was obtained. Using this polymer, pigment-containing particles were formed in the same way as with the fifth example. The particles were measured with a dynamic light scattering apparatus DLS7000 manufactured by Otsuka Electronics Co., Ltd., and as a result, an average particle diameter of 280 nm, and a particle distribution of 0.13, were obtained. The particle dispersion solution was placed and left standing still between glass substrates on which ITO electrodes have been each formed with a space of 300 μm therebetween, and upon applying an AC voltage of 300 V and 10 Hz to the ITO electrodes, the black particles exhibited electrophoresis according to the electric field.

EIGHTH EXAMPLE

With the eighth example, one unit by weight of the polymer used in the seventh example and 1.4 units by weight of Carbon Black were mixed in 120 units by weight of ISOPER, and following dispersion of the mixture solution by a homogenizer, filtration was performed with a membrane filter with pores of 2 μm so as to remove coarse particles, so that a ISOPER dispersion solution of Carbon Black was adjusted. Measurement was made with the dynamic scattering light dispersion apparatus DLS7000 manufactured by Otsuka Electronics Co., Ltd., in the same way as with the seventh example, and as a result, it was confirmed that a dispersion solution having an extremely uniform particle distribution with an average particle diameter of 240 nm and a particle distribution of 0.05 was obtained. The particle dispersion solution was placed and left standing still between the glass substrates on which copper electrodes have been each formed with a space of 300 μm therebetween, and upon applying an AC voltage of 300 V and 10 Hz to the copper electrodes in the same way as with the seventh example, the black particles exhibited electrophoresis according to the electric field.

As described above, the present invention provides a particle composition and a composition wherein particles are dispersed, which exhibits excellent dispersion properties and can form superbly uniform particles.

Furthermore, the present invention provides a display element, recording method, and recording apparatus, which employs the aforementioned composition which has excellent dispersion properties and forms superbly uniform particles.

While the present invention has been described with reference to what are presently considered to be the preferred examples, it is to be understood that the invention is not limited to the disclosed examples. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display element employing an electrophoretic particle composition, which comprises a non-aqueous solvent and reverse micelle particles
    wherein the reverse micelle particles are formed of block polymers having a hydrophobic block segment and a hydrophilic block segment, and
    wherein both the hydrophobic block segment and the hydrophilic block segment have a repeated unit structure of polyvinyl ether.

2. An electrophoretic particle composition comprising a non-aqueous solvent and reverse micelle particles
    wherein the reverse micelle particles are formed of block polymers having a hydrophobic block segment and a hydrophilic block segment, and
    wherein both the hydrophobic block segment and the hydrophilic block segment have a repeated unit structure of polyvinyl ether.

3. The composition according to claim 1, wherein an average particle diameter of the reverse micelle particles is equal to or less than 200 nm, and a particle distribution (dispersion index $m/G^2$) thereof is equal to or less than 0.2.

* * * * *

UNITED STATES PATENT AND TRADEMARK OFFICE
CERTIFICATE OF CORRECTION

| | | |
|---|---|---|
| PATENT NO. | : 7,300,971 B2 | |
| APPLICATION NO. | : 10/457419 | |
| DATED | : November 27, 2007 | |
| INVENTOR(S) | : Koichi Sato et al. | |

It is certified that error appears in the above-identified patent and that said Letters Patent is hereby corrected as shown below:

ON TITLE PAGE ITEM [57] ABSTRACT

Line 6, "is" should read --are--.

COLUMN 1

Line 41, "a" should read --an--.

COLUMN 2

Line 31, "R8 is" should read --$R_8$ is--.

COLUMN 5

Line 16, "R8 is" should read --$R_8$ is--.

COLUMN 6

Line 36, "represents" should read --represent--; and "which" should read --with--.

COLUMN 9

Line 9, "is" should read --are--;
Line 16, "is" should read --are--;
Line 25, "is" should read --are--;
Line 36, "is" should read --are--; and
Line 63, "-142,; C.I. Direct" should read -- -142; C.I. Direct--.

COLUMN 10

Line 1, "C.I Acid" should read --C.I. Acid--;
Line 2, "C.I Acid" should read --C.I. Acid--;
Line 3, "C.I Acid" should read --C.I. Acid--;
Line 5, "C.I Acid" should read --C.I. Acid--;
Line 7, "C.I Acid" (both occurrences) should read --C.I. Acid--;
Line 8, "C.I Reactive" should read --C.I. Reactive--;
Line 9, "C.I Reactive" should read --C.I. Reactive--;

UNITED STATES PATENT AND TRADEMARK OFFICE
CERTIFICATE OF CORRECTION

PATENT NO. : 7,300,971 B2
APPLICATION NO. : 10/457419
DATED : November 27, 2007
INVENTOR(S) : Koichi Sato et al.

It is certified that error appears in the above-identified patent and that said Letters Patent is hereby corrected as shown below:

COLUMN 10 (Cont.)

Line 13, "C.I Reactive" should read --C.I. Reactive--;
Line 18, "C.I Reactive" should read --C.I. Reactive--;
Line 24, "C.I Reactive" should read --C.I. Reactive--;
Line 26, "C.I Reactive" should read --C.I. Reactive--;
Line 27, "C.I Reactive" should read --C.I. Reactive--; and "C.I" should read --C.I.--;
Line 29, "C.I Basic" (both occurrences) should read --C.I. Basic--;
Line 30, "C.I Basic" should read --C.I. Basic--;
Line 31, "C.I Basic" should read --C.I. Basic--;
Line 32, "I Food" should read --I. Food--; and
Line 62, "particle" should read --particles--.

COLUMN 11

Line 40, "spectoscopy" should read --spectroscopy,--; and
Line 55, "of" should be deleted.

COLUMN 12

Line 2, "for" should read --to--;
Line 7, "includes" should read --include--; and
Line 64, "display" should read --displaying.--.

COLUMN 16

Line 46, "Polymethacrylic" should read --polymethacrylic--.

COLUMN 17

Line 26, "a" should read --an--.

UNITED STATES PATENT AND TRADEMARK OFFICE
CERTIFICATE OF CORRECTION

PATENT NO. : 7,300,971 B2
APPLICATION NO. : 10/457419
DATED : November 27, 2007
INVENTOR(S) : Koichi Sato et al.

It is certified that error appears in the above-identified patent and that said Letters Patent is hereby corrected as shown below:

COLUMN 18

Line 21 claim 1, "particles" should read --particles,--;
Line 29 claim 2, "particles" should read --particles,--; and
Line 36 claim 2, "claim 1," should read --claim 2,--.

Signed and Sealed this

Eighth Day of July, 2008

JON W. DUDAS
*Director of the United States Patent and Trademark Office*